Oct. 24, 1967     M. A. KOHN     3,349,384
AIR BEARING MAGNETIC TRANSDUCER ASSEMBLY
Filed Feb. 27, 1964
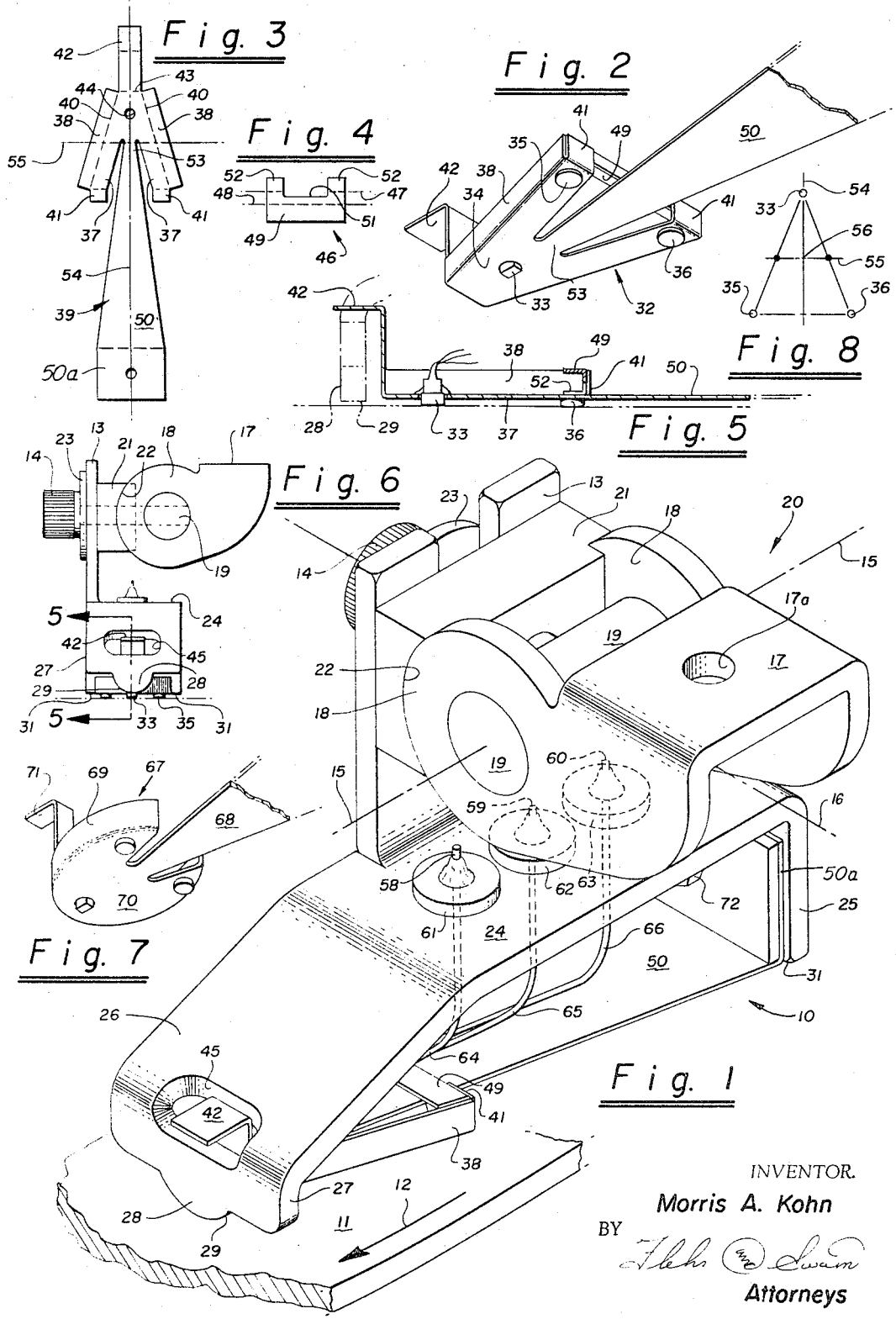
INVENTOR.
Morris A. Kohn
BY
Attorneys

United States Patent Office 3,349,384
Patented Oct. 24, 1967

3,349,384
AIR BEARING MAGNETIC TRANSDUCER
ASSEMBLY
Morris A. Kohn, San Mateo County, Calif., assignor to
Data-Disc, Incorporated, Palo Alto, Calif., a corporation of Nevada
Filed Feb. 27, 1964, Ser. No. 347,827
12 Claims. (Cl. 340—174.1)

ABSTRACT OF THE DISCLOSURE

A transducer assembly supports a magnetic recording transducer by means of a support member arranged to carry the transducer in recording relation to the "runout" movements of the recording surface. A platform, adapted to carry the transducer element in recording relation to the moving recording surface, is supported from an elongated resilient support arm carried by a housing assembly. The support member, comprising generally the support arm and transducer assembly, is arranged to be kept within its housing notwithstanding handling of the housing. The housing assembly carrying the support arm and transducer has been further constructed to aid in aligning and installing the support member and transducer assembly.

---

This invention relates to transducer assemblies and more particularly to means for mounting a transducer element to carry the element in constant following relation to the movements of a recording surface coacting therewith during recording or reproducing operations.

In reading and/or recording information on rigid media, for example, as found in magnetic recording on rotating drums or discs, the problem of "runout" can and has presented well-known problems of registration, resolution, and signal amplitude. The term "runout" refers to that characteristic of rotating surfaces wherein the surface tends to include movements perpendicular thereto. This problem is particularly pronounced in rotating discs where there is a tendency for the recording surface to deviate from its mean plane of rotation. Manufacturing and mechanical considerations make it extremely difficult, if not virtually impossible, to provide a rotating disc which will operate with no "runout," particularly in discs of larger diameters.

In magnetic recording, where a transducer element is arranged to ride in contact with the recording surface, optimum magnetic recording is impaired when the magnetic transducer is not maintained in continuous surface contact with a substantially constant applied pressure.

It is a general object of the present invention to provide an improved transducer assembly primarily useful in contact recording for carrying a transducer element in constant following relation to the movements of a recording surface in a direction perpendicular thereto.

It is another object of the invention to provide a transducer assembly which is capable of accommodating a wide range of surface runout conditions with minimum deviation in registration and contact forces.

A more particular object of the invention is to provide a transducer assembly which is relatively free of hydrodynamic effects caused by the laminar air film which follows a rotating surface such that uniform contact forces can be maintained over a wide range of surface speeds.

Still another object of the invention is to provide a transducer assembly wherein the spring-loaded portion is of low mass such that with minimal forces the transducer will remain in contact with the recording surface in severe environments of shock and vibration.

A further object of the invention is to provide a transducer assembly on which all critical manufacturing operations can be performed prior to installation at the recording surface, such that initial installation and field replacement become highly simplified.

Yet another object of the invention is to provide a transducer assembly, the major components of which are metal stampings, such that with minimal tooling, manufacturing costs of the complete assembly will be exceedingly low.

These and other objects of the invention will be more clearly apparent from the following description of a preferred embodiment when taken with the accompanying drawings in which:

FIGURE 1 is a perspective view of a transducer assembly according to the invention;

FIGURE 2 is a perspective view of a transducer support element according to the invention;

FIGURES 3 and 4 are plan views of two stampings adapted to be formed into a support element as shown in FIGURE 2;

FIGURE 5 is an elevation sectional view taken along the line 5—5 of FIGURE 6;

FIGURE 6 is an elevation view as seen from the trailing end of the transducer assembly;

FIGURE 7 shows an alternative embodiment of the support element shown in FIGURE 2; and FIGURE 8 is a diagram arranged to define the location of the point of application of a loading force to the transducer bearing element.

In general, a transducer assembly has been provided of the kind wherein a recording transducer is disposed to record signals on a movable recording surface. A support member is arranged to carry the transducer in constant following relation to movements of the surface normal thereto.

The support member includes a platform adapted to carry a transducer in recording relation to the movable recording surface, and an elongated resilient arm. The arm is joined to the platform via a neck portion and dimensioned so that the platform can twist the neck portion of the arm about the longitudinal axis thereof as well as bend the neck portion of the arm about an axis extending transversely thereto. Thus, the arm includes a portion adjacent one end which is free to be resiliently twisted about its longitudinal axis and bend about a transverse axis. The platform is given substantial rigidity in the plane thereof by an L-shaped edge construction.

At least three spaced, nonaligned supporting projections are disposed to protrude from the platform to the recording surface to ride thereon and support the platform above the laminar film of air which travels at the recording surface in normal environments. The closer the platform is carried to the laminar film, the greater will be the tendency of the platform to be supported by it. In the past, the supporting force of the laminar film acting on a contact-recording "shoe" has required a significant additional loading force to be applied to the shoe solely to overcome the supporting effect of the film.

According to the construction disclosed in detail further below, the supporting effect of the laminar film is nullified to permit a minimal spring force to maintain the transducer in a stable, constant-following surface contact relation.

The three supporting projections include a transducer element and a pair of bearing members thereby providing a stable, three-point support of the platform. The three points of support, when taken with the resilient arm define an arrow-shaped configuration adapted to point in the direction of movement of the record surface.

With reference to the drawing, a transducer assembly 10 is arranged to be carried by a mounting assembly 20 to dispose the transducer at a recording path on a surface 11, rotating in the direction of arrow 12. Transducer assembly 10 includes a forked mounting tab 13 serving to support the transducer assembly from mounting assembly 20 by means of a knurled machine screw 14.

Mounting assembly 20 permits quick and easy installation and alignment of transducer assembly 10. As will be described in detail below, means are provided for mounting a housing member 24 for adjustably establishing a clearance spacing between the plane of the lower extremities of the housing member and the plane of the recording surface so as to accommodate any desired degree of runout. The same means further serves to enable the plane defined by the lower extremities of the housing member to tilt about mutually perpendicular axes. The axes are nominally parallel to and spaced from the plane defined by the lower extremities, permitting a precision parallel alignment of the plane of the lower extremities with respect to the plane of the recording surface.

In short, the single releasable locking member, in the form of screw 14, serves to release the housing member for both tilting and spacing the plane defined by the lower extremities of the housing member.

In general, then, for purposes of quickly installing and aligning a transducer assembly 10, the mounting assembly 20 is positionable angularly about each of two axes 15, 16. It is also vertically adjustable for leveling and spacing the rigidly supporting components of transducer assembly 10 slightly away from recording surface 11. This spacing serves to accommodate any expected "runout." All installation adjustments are, therefore, under control of the single screw 14.

A mounting stirrup 17 is attached by means of a fastener placed through hole 17a to a rigid or positionable member. Stirrup 17 is formed to include a pair of ears 18 which support a pivot pin 19 journaled therein. Pivot pin 19 rotates around axis 15. A clamping block 21 is formed to include annular gripping surfaces 22 at each end to ride upon the outer peripheral surface of ears 18.

Block 21 and pin 19 each include a hole to be aligned and receive screw 14. The hole in pin 19 is threaded whereby screw 14 can clamp tab 13 between a washer 23 and the flush side of block 21 thereby locking transducer assembly 10 in any desired position. The frame or housing member 24 of transducer assembly 10 is shaped to aid in the leveling alignment of the head arrangement as will be explained in detail below.

In general, the housing member is shaped to include depending extremities which define, on mutual contact with a plane surface, a triangle lying in a plane adapted to be positioned parallel to the plane of a recording surface adjacent thereto. Thus the somewhat U-shaped housing member 24 includes a downwardly depending mounting end 25 and a "head" portion 26, the latter being bent downwardly in two stages. The downwardly depending lip 27 includes a projecting tongue 28, the lower surface 29 of which is rounded to form a broad point of support for the housing portion 24 when installation adjustments are to be made. The flat bottom surface 31 of end portion 25 is formed to lie in a plane whereby contact with surfaces 29 and 31 readily defines a triangle to permit screw 14 to lock housing 24 (and transducer assembly 10) to dispose the plane of the extremities thereof in a plane lying parallel to surface 11.

In the transducer assembly herein described, a recording transducer element 33 is carried by a bearing element or platform 34 supported from a resilient arm 50 in a manner whereby the plane of the bearing element is permitted to rock about intersecting axes lying therein whereby the transducer maintaines a constant following relation with the recording surface.

Thus, a transducer support member 32 for carrying a transducer 33 in contact with recording surface 11 is defined generally by the triangular disposition of three spaced nonaligned supporting projections. The projections protrude from a platform 34 and ride upon surface 11. One of the projections is formed by the recording transducer 33. The other two projections are provided by a pair of sapphire endstones or rubies 35, 36 making slider bearing contact with the recording surface. The three projections 33, 35, 36 are arranged in a triangular configuration as shown in FIGURE 8.

The projections are each carried by platform 34. The projections extend from the platform sufficiently to support the latter well above the layer of laminar air flow that is virtually always present on rapidly moving surfaces operating in the atmosphere. The extent of protrusion can, therefore, be on the order of 0.015 inch. Laminar film effects are substantially negligible above 0.001 inch. Therefore, only a minimum spring loading is necessary to urge the transducer into contact with the surface.

Platform 34 is given substantial rigidity in a plane parallel to and spaced from the ends of projections 33, 35, 36. Thus, platform 34 can be formed from two pieces of thin shimstock material such as the two stampings 39 and 46 shown in FIGURES 3 and 4 respectively. Accordingly, the platform portion of stamping 39 (FIGURE 3) is formed as an arrow-shaped configuration wherein each "barb" 37 of the arrow is provided with a tab portion 38 outstanding therefrom and formed along the outer edge thereof. Tab portions 38 are bent along lines 40 to a position substantially normal to the plane of stamping 39. The bars 37 are further provided with tabs 41 to be bent normal to the plane of stamping 39 and form the ends of bars 37. At the truncated tip of the arrow-like configuration, there is provided an elongated rectangular finger 42 which is likewise bent substantially normal to the plane of stamping 39, and subsequently a portion is bent parallel to the plane of platform 34.

After portions 38 and finger 42 have been bent along their respective fold lines 40, 43, a recording transducer 33 is mounted to extend through a hole 44. The top side of transducer 33 is encapsulated by filling the tip of the arrow with a potting material whereby transducer 33 is fixed in place and the adjacent edges of finger 42 and portions 38 are thereby joined. Finger 42 is adapted to extend upwardly through an opening 45 in portion 26 of housing portion 24, and is bent over the edge of opening 45 to form a fixed stop serving to limit the downward travel of transducer 33. Endstones 35, 36 are secured to the surface of barbs 37 adjacent the tips thereof, preferably prior to potting the transducer. Rigidity is imparted between the tips of barbs 37 by means of the stamping 46 shown in FIGURE 4. Stamping 46 is folded along lines 47 and 48 forming a top brace 49 adapted to span between the tips of borbs 37. Brace 49 is disposed to extend transversely of an elongated spring arm 50 in a plane above the arm. Brace 49 is strengthened by an arch portion 51 folded to a plane substantially normal to brace 49. Finally, the tips 52 of the arch portion are folded in a plane parallel to and overying brace 49. After stamping 46 has been folded as above described, it provides a U-shaped elevation configuration having substantial structural strength comparable to the strength provided by the L-shaped sides of the platform.

A cantilever spring arm 50 is formed and adapted to carry and resiliently urge platform 34 toward the recording surface while permitting constant surface-following movement of platform 34.

Spring arm 50 is formed of a low modulus material and is preferably integral with platform 34 to support same through a neck portion 53. Neck portion 53 is dimensioned so that platform 34 can twist about the longitudinal axis 54. Neck portion 53 also permits platform 34 to bend about an axis 55 extending laterally through neck portion 53 substantially in the plane of the platform.

Thus, the point of insection 56 of axes 54, 55 serves to define substantially the region where arm 50 is flexibly secured to platform 34 at the free end of the former.

The other end of arm 50 includes a tab portion 50a outstanding therefrom. Tab portion 50a is adapted to be bent normal to the plane of arm 50 whereby the support element comprising arm 50 and platform 34, can be mounted to housing member 24 by a screw through end 25 and nut 72 thereon.

Retaining means are provided whereby platform 34 is prevented from falling out of its protected disposition with respect to portion 24. Thus, the edge of opening 45 engages finger 42 extending therethrough. When transducer 33 is riding on recording surface 11, finger 42 is disposed clear of the lower edge of opening 45. However, whenever transducer assembly 10 is removed from a transducing disposition, or when the recording surface is removed, platform 34 and transducer 33 are prevented from dropping below a generally protected relation.

In order to provide electrical connections to transducer 33 along the top of housing 24, three terminals 58, 59, 60 are formed in the center of insulated plugs 61, 62, and 63. Leads 64, 65 and 66 are, therefore, brought out from transducer element 33 to terminals 58–60.

Another embodiment of the invention is shown in FIGURE 7 wherein a cup-shaped platform 67 is carried on the end of an arm 68. Platform 67 is formed with an annular side wall 69 disposed substantially normal to the bottom surface 70 of the platform so as to provide considerable rigidity in the plane of bottom surface 70. A structure as shown in FIGURE 7 can be readily formed, for example, as by drawing the sides and finger 71 from a sheet of flat shim material, and then bending finger 71. Installation is quickly accomplished.

By previously disposing the arrow-shaped support element in a true position with respect to housing 24 and assuming that stirrup 17 is mounted in place to a suitable recording apparatus (not shown), the transducer assembly is easily installed. Screw 14 is loosened and swung about axis 15 to a vertical orientation. Tab 13 is then slipped between washer 23 and block 21. Assembly 10 is then swung generally to a recording orientation for adjusting the "runout" clearance. A flat sheet of shimstock of a thickness corresponding to the desired "runout" clearance between surfaces 29, 31 and recording surface, 11, e.g., 0.015 inch, is placed on the recording surface 11. The transducer assembly is lowered onto the shim whereby surfaces 29, 31 (and the underside of arm 50 in the region of surface 31), make contact with the shim. Screw 14 is tightened and the shim removed thereby permitting transducer 33 and endstones 35, 36 to drop a corresponding distance downwardly to the recording surface. Parallelism between the recording surface and the plane defined by the triangular contact surfaces 29, 31 to the shimstock is readily established by the bi-axial alignment permitted by loosening screw 14.

In operation, the transducer assembly is disposed to place transducer element 33 and bearing elements 35, 36 in contact with recording surface 11. The support element comprising platform 34 and arm 50 is arranged to point generally in the direction of movement of the recording surface. Accordingly, transducer element 33 trails the bearing elements 35, 36 and is arranged to lie in a recording path defined on surface 11. The platform is supported well above the laminar layer of air whereby aerodynamic support therefrom is not experienced and need not be overcome by the resilient urging of arm 50.

As surface "runout" is experienced, the support arm 50 resiliently urges platform 34 to maintain the three projections continuously in contact with the recording surface with minimum deviation in the contact forces. The support member 32 further provides a stable "tripod" contact against the recording surface whereby the plane defined by the ends of the projections can rock about intersecting axes lying therein. Thus, the transducer maintains a constant following contact with the surface movements.

I claim:
1. In a transducer assembly wherein a recording transducer is disposed to record signals on a movable recording surface, a support member for carrying the transducer in constant following relation to movements of the surface in a direction normal thereto, said support member comprising a platform adapted to carry a transducer in recording relation to said surface, and an elongated resilient arm, said arm including a single narrow neck portion adjacent an end of same free to be resiliently twisted about the longitudinal axis of said arm and to bend about an axis transversely thereof, said arm being flexibly secured to and unitary with said platform via said neck portion at said end and adapted to resiliently urge said platform toward the surface while permitting constant surface-following movement thereof.

2. Apparatus as defined in claim 1 wherein said platform includes a generally planar bottom of thin sheet material and upwardly extending sides substantially perpendicular to the bottom whereby substantial rigidity is imparted to said platform in the plane of said bottom.

3. Apparatus as defined in claim 1 wherein said arm and said platform are formed from a single sheet of material to provide said neck portion as an integral interconnecting construction therebetween.

4. Apparatus as defined in claim 1 wherein said narrow neck portion lies substantially at the intersection of said longitudinal and transverse axes.

5. In a transducer assembly wherein a recording transducer is disposed to record signals on a movable recording surface, a support member for carrying the transducer in constant following relation to movements of the surface in a direction normal thereto, said support member comprising a platform adapted to carry a transducer in recording relation to said surface, and an elongated resilient arm, said arm including a portion adjacent an end of same free to be resiliently twisted about the longitudinal axis of said arm and to bend about an axis transversely thereof, said portion lying at the intersection between said axes, said arm being flexibly secured to and unitary with said platform via said portion and adapted to resiliently urge said platform toward the surface while permitting constant surface-following movement thereof.

6. In a transducer assembly for supporting a transducer element in constant following relation to a record surface moving with respect thereto, a housing member, resilient mounting means including an elongated arm and a bearing element for carrying a transducer, one end of said arm being firmly secured to the housing member, the other end of said arm being joined to and unitary with said bearing element via a single narrow neck portion and dimensioned so that said bearing element can twist about the longitudinal axis of said arm and bend about an axis extending transversely thereto, said neck portion lying substantially at the intersection of said axes.

7. In a recording system having a moving recording surface, a transducer assembly for disposing a transducer in constant following relation to said surface to record signals thereon, said assembly comprising a substantially rigid platform, a transducer carried by said platform to record on said surface, means including said transducer carried by said platform to contact said moving surface at least at three spaced nonaligned points to support said platform spaced from the surface, and means for carrying said platform to permit the plane of said platform to rock about intersecting axes lying therein whereby said transducer maintains a constant following contact with said surface.

8. An assembly of the type described in claim 7 wherein the first said means includes three surface-contacting projections extending sufficiently from said platform to support said platform above the layer of laminar air flow on said surface.

9. In a transducer assembly wherein a recording transducer is disposed to record signals on a movable recording surface, a support member for carrying the transducer in constant following relation to movements of the surface in a direction normal thereto, said support member comprising a platform adapted to carry a transducer in recording relation to said surface, and an elongated resilient arm, said arm including a portion adjacent an end of same free to be resiliently twisted about the longitudinal axis of said arm and to bend about an axis transversely thereof, said arm being flexibly secured to said platform at said end and adapted to resiliently urge said platform toward the surface while permitting constant surface-following movement thereof, at least three spaced nonaligned supporting projections disposed to protrude from said platform toward said surface to ride thereon, a transducer forming one of said projections and providing a first point of support, a pair of bearing members formed to provide second and third points of support disposed on opposite sides of the longitudinal axis of the arm wherein said three projections and said arm define an arrow-shaped configuration, and a member carrying said support element from that end region thereof remote from said platform and adapted to dispose the arrow-shaped configuration in the direction of movement of the recording surface.

10. A device as defined in claim 9 wherein the last-named member comprises a rigid housing member carrying said arm, said housing member being formed to include depending extremities thereof defining, on mutual contact with a plane surface, a triangle lying in a plane adapted to be positioned parallel to the plane of a recording surface adjacent thereto.

11. A device according to claim 10 further including means for mounting said housing member for adjustably establishing a clearance spacing between the planes of said triangle and the recording surface, and to tilt the former about mutually perpendicular axes spaced parallel thereto for precision parallel alignment of the plane of the triangle with the plane of said surface, said means including a single releasable locking member serving to release said housing for tilting and spacing the plane of said triangle and to lock said member thereafter to maintain the adjustment.

12. In a transducer assembly for supporting a transducer element in constant following relation to a record surface moving with respect thereto, a housing member, resilient mounting means including an elongated arm and a bearing element for carrying a transducer, one end of said arm being firmly secured to the housing member, the other end of said arm being joined to said bearing element and dimensioned so that said bearing element can twist about the longitudinal axis of said arm and bend about an axis extending transversely thereto, said housing member including an opening extending therethrough, and said platform including an elongated finger initially extending away from the plane thereof to be received in said opening and bent to overlie the lower edge of the opening, said finger being disposed for vertical movement free of the edges of said opening when said transducer element is in recording position with respect to said surface and to engage the lower edge of said opening when said platform moves away from said housing member upon removal of said transducer assembly relatively away from a recording disposition with respect to the recording surface.

References Cited
UNITED STATES PATENTS 2,802,905  8/1957  Taris _____ 179—100.2
3,177,495  4/1965  Felts _____ 179—100.2

BERNARD KONICK, *Primary Examiner.*

A. I. NEUSTADT, *Assistant Examiner.*